United States Patent
Howorka

(10) Patent No.: US 7,383,221 B2
(45) Date of Patent: Jun. 3, 2008

(54) ANONYMOUS TRADING SYSTEM WITH IMPROVED QUOTE INPUT CAPABILITIES

(75) Inventor: Edward R. Howorka, Morris Plains, NJ (US)

(73) Assignee: EBS Dealing Resources, Inc., New York, NY (US)

( * ) Notice: Subject to any disclaimer, the term of this patent is extended or adjusted under 35 U.S.C. 154(b) by 1276 days.

(21) Appl. No.: 09/927,868

(22) Filed: Aug. 10, 2001

(65) Prior Publication Data

US 2002/0082976 A1 Jun. 27, 2002

Related U.S. Application Data

(63) Continuation of application No. 09/029,181, filed as application No. PCT/US96/14086 on Aug. 28, 1996, now Pat. No. 6,282,521.

(60) Provisional application No. 60/002,856, filed on Aug. 28, 1995.

(51) Int. Cl.
*G06Q 40/00* (2006.01)
(52) U.S. Cl. .......................... 705/37; 705/35
(58) Field of Classification Search .................. 705/35, 705/37, 36
See application file for complete search history.

(56) References Cited

U.S. PATENT DOCUMENTS

| 4,412,287 A | 10/1983 | Braddock, III ............... 364/408 |
| 5,101,353 A * | 3/1992 | Lupien et al. ................. 705/37 |
| 5,136,501 A | 8/1992 | Silverman et al. ........... 364/408 |
| 5,168,446 A | 12/1992 | Wiseman |
| 5,270,922 A | 12/1993 | Higgins ....................... 364/408 |
| 5,297,031 A | 3/1994 | Gutterman et al. |
| 5,297,032 A | 3/1994 | Trojan et al. ............... 364/408 |
| 5,375,055 A | 12/1994 | Togher et al. ............... 364/408 |
| 5,717,989 A | 2/1998 | Tozzoli et al. ................. 705/37 |
| 5,802,499 A | 9/1998 | Sampson et al. |
| 5,873,071 A | 2/1999 | Ferstenberg et al. |
| 5,915,209 A | 6/1999 | Lawrence |
| 5,924,082 A | 7/1999 | Silverman et al. |
| 5,946,666 A | 8/1999 | Nevo et al. |
| 5,950,177 A | 9/1999 | Lupien et al. |
| 5,963,923 A | 10/1999 | Garber |

(Continued)

OTHER PUBLICATIONS

C. Howe, "Wiring the World," Datamation; p. 58 (Oct. 1, 1984).

(Continued)

*Primary Examiner*—James A. Kramer
*Assistant Examiner*—Jocelyn W. Greimel
(74) *Attorney, Agent, or Firm*—Dickstein, Shapiro, LLP.

(57) ABSTRACT

For each quote entered into a computerized anonymous trading system, the system determines if it is waiting to be "hit" (would be matched with the first hit of a predetermined size) at a substantial number of trading floors, and if so, notifies the trader originating the quote. The substantial number of floors is preferably expressed as greater than a predetermined percentage of the available trading partners with whom credit has been established on a bilateral basis, and is preferably greater than 25%. In an alternate embodiment, the system provides a graphical display to the market maker originating a particular quote indicating how many trading floors are poised to hit that particular quote, and/or a numeric display indicating a price that would be Hittable by a predetermined number or percentage of available trading partners.

10 Claims, 4 Drawing Sheets

U.S. PATENT DOCUMENTS

| | | | |
|---|---|---|---|
| 6,014,627 A | 1/2000 | Togher et al. ............... 705/1 |
| 6,014,643 A | 1/2000 | Minton |
| 6,115,698 A * | 9/2000 | Tuck et al. ............... 705/37 |
| 6,282,521 B1 | 8/2001 | Howorka |
| 6,304,858 B1 | 10/2001 | Mosler et al. |
| 6,317,727 B1 | 11/2001 | May |
| 6,343,278 B1 | 1/2002 | Jain et al. |
| 6,347,307 B1 | 2/2002 | Sandhu et al. |
| 6,408,282 B1 | 6/2002 | Buist |
| 6,421,653 B1 | 7/2002 | May |
| 6,519,574 B1 | 2/2003 | Wilton et al. |
| 6,839,686 B1 | 1/2005 | Galant |

OTHER PUBLICATIONS

Merrill Lynch's Network Add-On Makes Bid as a National Market Entry, Data Communications; p. 20 (Dec. 1979).

J. Seligman, "Another Unspecial Study: the SEC's 'Market 2000' Report and Competitive Developments in the United States Capital Markets. (Symposium on the Regulation of Capital Markets)," Business Lawyer; vol. 50, No. 2; pp. 485-526 (Feb. 1995).

P.S. Duggal, "Hummingbird's Shares Now Trade in NASDAQ National Market," PR Newswire; p. 425 (Apr. 1994).

M. Beauchamp, "Individual Investor Orders Would be Displayed in Best Quote on NASDAQ Under New Proposal," PR Newswire; p. 925 (Sep. 1995).

"Another First for Pro-Fac Cooperative: Preferred Stock Approved for NASDAQ," PR Newswire; p. 823(Aug. 1995).

J. Hodges, "NASDAQ Launches the Small Order Execution System, for Rapid Execution of Trades of up to 500 Shares," PR Newswire (Dec. 1984).

J.P. Bunting, "The Changing Securities Game,"Management Review; vol. 79, No. 1; p. 64 (Jan. 1990).

"QTC Trading Systems Lead in Race to Automate (the National Association of Securities Dealers NASDAQ National Market System Handles the Top 2,610 Over-the-Counter Stocks)," Wall Street Computer Review; vol. 8, No. 2; p. 31(5) (Nov. 1990).

S. O'Heney, "Can Image Processing Preclude Paper?" (Includes related article on desktop publishing). Computers in Banking; vol. 5, No. 9; p. 32(5) (Sep. 1998).

I. Schmerken, "The Electronic Broker that Could (Charles Schwab and Company Inc., Schwab Architecture Migration Strategy Upgrade Project)," Wall Street Computer Review; vol. 8, No. 12; p. 42(5) (Sep. 1991).

"Automatching Fully Live on Hong Kong Exchange," Financial Technology Insight; p. N/A (Apr. 1994).

N. Cohen, "Competition Comes to Market: SIB's Report Sets out a Blueprint for a New Regulatory Structure in London," Financial Times London Edition; p. 17 (Jun. 1995).

M. Beauchamp, "Individual Investor Orders Would be Displayed in Best Quote on NASDAQ Under New Proposal," PR Newswire; p. 925 (Sep. 1995).

P. Bonner, Do-It-Yourself: Windows Broker; PC Computing; vol. 4, No.6; p. 172(8) (Jun. 1991).

L.P. English, "The New Object Databases at Work," DBMS; vol. 7, No. 3; p. 66(7) (Mar. 1994).

K. Yamada, "Integrator Digitizes Stock Trading Transaction Using PDA Technology," Computer Reseller News; No. 638; p. 6 (Jul. 1995).

K. Corcella, "Tomorrow's Tools of the Trade," Wall Street & Technology; vol. 10, No. 11; p. 50 (Jun. 1993).

R.D.R. Hoffmann, "A Margin for the Electronic Broker," Personal Computer, p. 90(3) (Oct. 1989).

K. Corcella, "Packing Proprietary System for Overseas," Wall Street & Technology; vol. 11, No. 12; p. 14 (Apr. 1994).

K.G. Golden, "Toronto's Perpetual Project," Wall Street & Technology; vol. 12, No. 9; p. 18(3) (Mar. 1993).

L. Barney, "Will the Futures Industry Live Up to its Standard?" Wall Street & Technology; vol. 12, No. 15; p. 28(5) (Jun. 1993).

S. Gibbel, "Web Ad networks Give Marketers a New Option," NETmarketing (Sep. 1996).

S. Schoonmaker, "Trading On-Line: Information Flows in Advanced Capitalism," The Information Society; vol. 9, No. 1; pp. 39-49 (Jan. 1993).

M.J. Lennon, "United States Patent Rights in Financial Services Software," Computer Law & Practice; vol. 10, No. 1; p. 17 (Jan. 1994).

C.S. Holzberg, "Getting Started with Quiken: Part III," PC Novice; vol. 6, No. 5; p. 48 (May 1995).

"Cutting the Cost of Trading," Banking World; vol. 7, No. 3; p. 45(3) (Mar. 1989).

"Automating Financial Markets," Economist; vol. 314, No. 7645; pp. 19-24 (Mar. 10, 1990).

* cited by examiner

ANONYMOUS TRADING SYSTEM WITH IMPROVED QUOTE INPUT CAPABILITIES

CROSS-REFERENCE TO RELATED APPLICATIONS

This is a continuation of U.S. patent application Ser. No. 09/029,181, filed Jun. 15, 1998 in the name of Edward R. Howorka and entitled "ANONYMOUS TRADING SYSTEM WITH IMPROVED QUOTE INPUT CAPABILITIES", now U.S. Pat. No. 6,282,521, issued Aug. 28, 2001, which is a national stage application under 35 U.S.C. §371 of PCT/US96/14086, filed Aug. 28, 1996, and which was published in English, and claims benefit under 35 U.S.C. § 119(e) from U.S. Provisional Patent application 60/002,856, filed Aug. 28, 1995.

TECHNICAL FIELD

The present invention is directed generally to computerized trading systems and more particularly to a method and apparatus for anonymous trading wherein an individual offer is made available only to a subset of the available counterparties.

BACKGROUND ART

In many computerized trading systems, the participants (individual traders or institutions) are qualified in advance by an exchange and each offer is broadcast from one participant to all other qualified participants.

When the subject of the trade is a commodity (such as wheat or copper) or a financial instrument (such as Treasury Bills or foreign currency), multiple offers for the same commodity or instrument are conventionally ranked by price per unit. Depending on the trading conventions in effect, offers at the same price may be further ranked by size and/or time in a queue of available offers; however, for any given commodity or financial instrument, only one offer is at the head of an associate queue.

Under many market conditions, "market makers" (institutions and/or individual traders whose open offers are available to other traders) will set a price at or slightly above the best price currently available, with the expectation that their offer will reach the head of the relevant queue in due course. However, if there is a sudden change in market conditions, the market maker may wish to cancel or modify his outstanding offer before it reaches the head of the queue. To that end, it is known to warn the trader responsible for an open quote when his quoted price is equal to the best price currently available and/or when his offer reaches the head of queue. Similarly, if the maker's quote was ready to be accepted (i.e., it is the highest ranked quote in the system) but is subsequently bettered by another maker, the original maker may be given an opportunity to revise his offer or remove it from the market.

In the traditional voice broker foreign exchange market, the broker announces "Your bid" to a market maker when the maker's own quote is at the head of the queue; the broker also (optionally) announces and/or cancels that quote when someone else submits a better price.

In an anonymous electronic brokerage system such as the EBS system or Reuters 2000-2 in which individual trades of foreign currency are settled directly between two banks (or "trading floors") rather than through an exchange or a clearing house, the identity of the parties is kept confidential until an offer from one party has been matched to a bid from another party and the matching criteria include not only price, but also the existence of bilateral credit between the two parties. Thus, unlike a traditional voice broker who processes only one quote at a time (typically the first offer in the queue) and who provides both parties with an opportunity to accept or reject a potential trade after the parties have already been identified, a computerized matching process is able to perform many tasks concurrently and to use objective matching criteria (such as preestablished counterparty credit limits) without divulging any confidential credit information. Moreover, at least the known EBS system operates in a credit screened market in which a price is not offered to a potential counterparty unless it is "Dealable"— i.e., each party to the potential transaction has previously indicated a willingness to deal with the other party. Thus, there is no longer a single queue for a given currency, but a separate logical queue (typically containing only a subset of the open quotes for each trading floor). Accordingly, the known EBS system displayed an active quote on the maker's terminal in a red background (a so-called "Red Quote") if that quote was either the best Dealable (or the best regular size Dealable) quote on at least one trading floor, i.e., the quote was at the head of some floor's queue of "Dealable" quotes, thereby providing the maker with a signal that his quote has the potential of being about to be accepted. In addition to the visible warning (the quote is displayed on a red background), the EBS voice says "Your bid/offer" and the background of the key fields on the transaction panel turns from yellow to red. Preliminary versions of the EBS system also provided an indication if a quote was "joined" with a Red Quote, i.e., was in the Dealable queues of at least one trading floor and was equal to the best price that was Dealable to that floor, but was not at the head of the Dealable queue on any trading floor, and thus did not qualify as a Red Quote.

However, as a result of the lack of credit between many possible pairs of trading partners and the fact that market makers are reluctant to make an offer that is substantially worse than the best price that is currently available, almost every quote is at the head of the queue on at least one trading floor, and thus the indication that a quote was Dealable on at least one trading floor had limited practical value.

A quote that lost its red status (as indicated by the transaction panel fields turning from red to yellow) is said to be "bettered." If the "Cancel When Better option" in the trader profile is set, such a bettered Red Quote was automatically canceled by the EBS system.

More recent versions of the EBS system have also included a capability for aggregating a regular size (typically US $10 Million) Dealable quote from several quotes for smaller quantities to display a synthetic "regular" size Dealable price whose individual components had priority in time and/or price over any other available quotes. In that case, the "regular Dealable price" would be equal to the worst priced component of the aggregated deal.

BRIEF DISCLOSURE OF INVENTION

For each quote entered into the system by a market maker, the system determines if it is waiting to be "hit" (about to be accepted) at a substantial number of trading floors, and if so, notifies the trader originating the quote.

In accordance with one aspect of the invention, the substantial number of floors is preferably expressed as greater than a predetermined percentage of the available trading partners with whom credit has been established on a bilateral basis, and is preferably greater than 25%.

In accordance with another aspect of the invention, a quote is considered about to be accepted at a particular trading floor if it would be included as a component in an order at the Regular Dealable price currently available to that trading floor.

In accordance with yet another aspect of the invention, the system provides the market maker with a quantitative indication as to how many trading floors (or percentage of available trading partners) are about to accept his quote, and/or how good his quote must be to be Hittable by a given number of trading floors (or percentage of available trading partners).

The invention includes a process for notifying a maker in a computerized trading system that his offer is subject to being accepted by another trader using the trading system, the process comprising:

determining when a predetermined percentage of traders are permitted to accept the makers quote, the predetermined percentage being more than one and less than all of the traders with which the maker has bilateral credit; and informing the maker that his offer can be accepted by the predetermined percentage of traders.

In one embodiment, the maker is visually informed that his offer can be accepted by the predetermined percentage of traders. The maker may also be audibly informed that his offer can be accepted by the predetermined percentage of traders.

In the preferred embodiment, the trader is only permitted to accept the maker's quote if there is sufficient bilateral credit between the maker and the trader. In the preferred embodiment, the trader is only permitted to accept the maker's quote if there is sufficient bilateral credit between the maker and the trader and the maker's quote is the best available to the trader. In a further preferred embodiment, the maker's quote can be accepted only if it meets the foregoing criteria and is earlier in time to any other quote available to the trader at the same price.

In one embodiment, the maker is informed that his offer can be accepted by the predetermined percentage of traders by providing a maker with a quantitative indication of the percentage of traders who can accept his offer. The quantitative indication is preferably in the form of a graph.

BRIEF DESCRIPTION OF THE DRAWINGS

Other objects and features of the present invention will be apparent from the following description of a presently preferred embodiment taken in connection with the accompanying drawings, in which.

DETAILED DESCRIPTION OF EXEMPLARY EMBODIMENT

Figure 1:
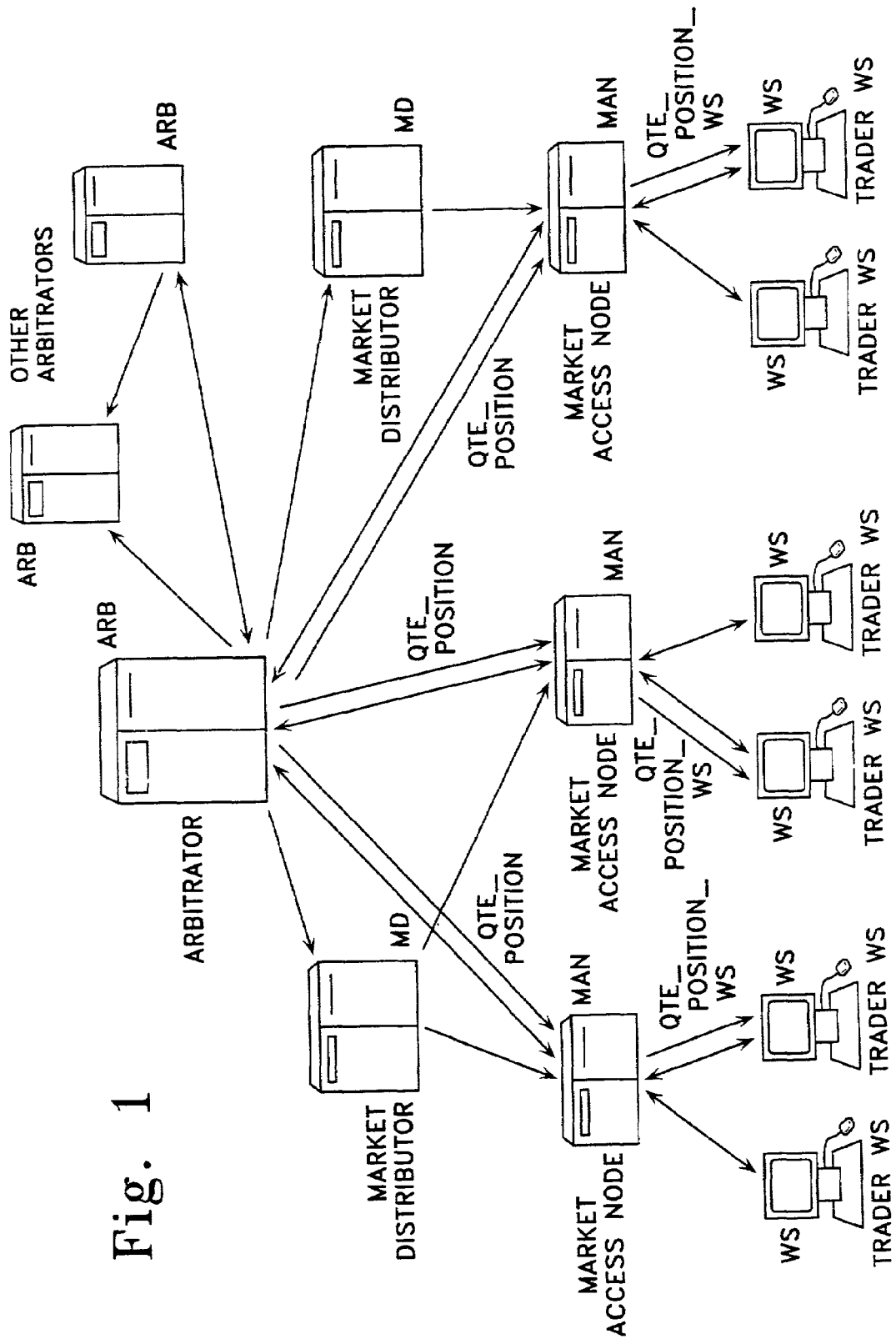
FIG. 1 is a functional overview of a computerized trading system in accordance with the present invention showing the sources of the data used to calculate the quote status message and how the status message is transmitted from the Arbitrator to the workstation.

FIG. 1 is a functional overview of the EBS system modified in accordance with the present invention. An early version of the EBS system is described in more detail in U.S. Pat. No. 5,375,055, which is hereby incorporated by reference.

The Arbitrator node ARB computes and maintains the status of all open quotes and sends QtePosition messages to the maker's Mark Access Node (bank node) MAN signaling any changes in the status of a quote. If a trader uses the Cancel When Bettered option, the QtePosition message also can be used by the bank node MAN to determine when his quote needs to be canceled.

Figure 2:
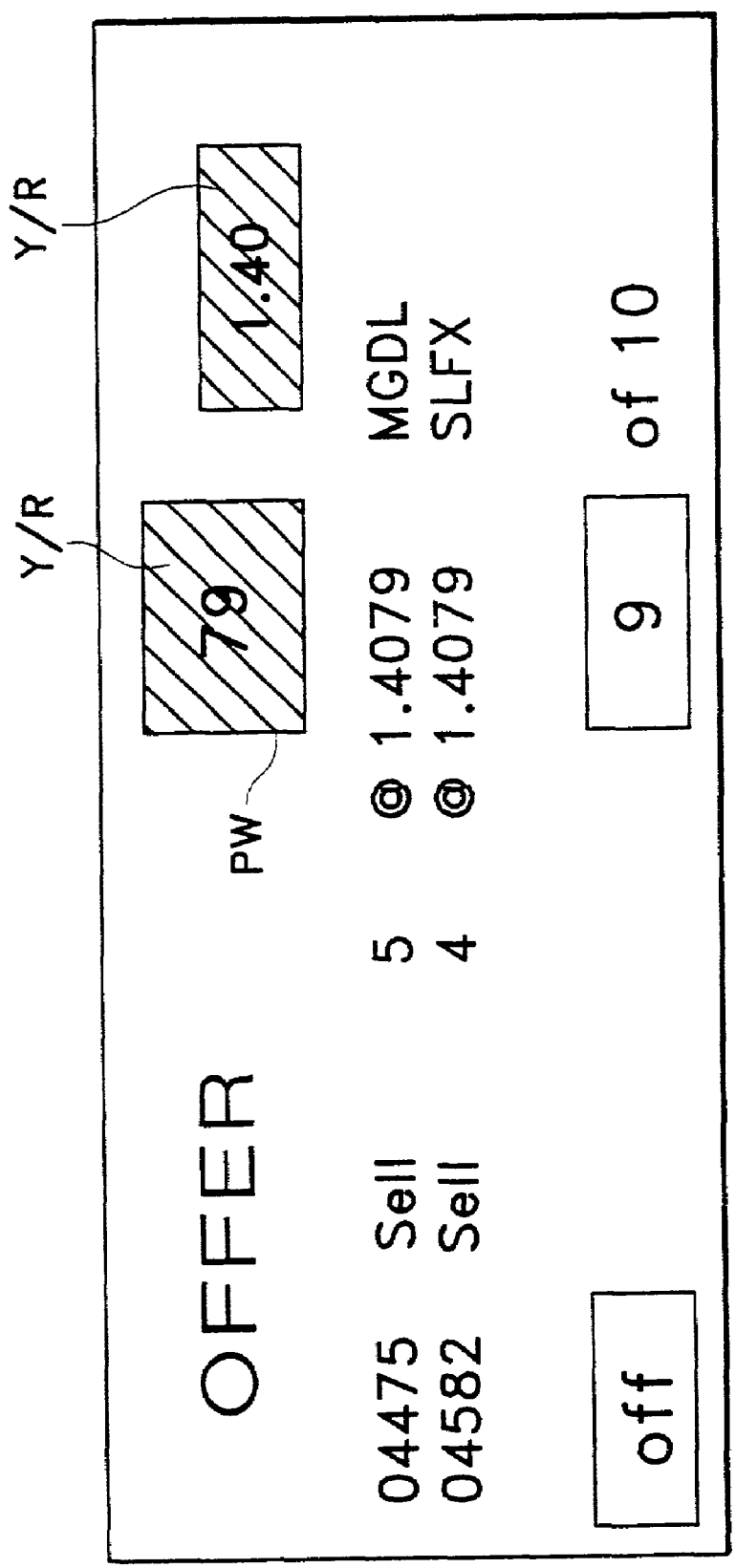
FIG. 2 shows the Transaction Panel of the known EBS system, which may be used without modification with the present invention.

Upon receiving the QtePosition message, the maker's bank node MAN sends the QtePositionWS message to the Workstation WS. The Workstation then processes the QtePositionWS message, updating the quote status display (FIG. 2) or canceling the quote, as appropriate.

The processing of the QtePosition and QtePositionWS messages may be conventional and unchanged from prior versions of the EBS system. In particular, when the status of an active quote on the Maker's Transaction Panel (FIG. 2) changes from normal (logical 0) to red (logical 1), the background color Y/R of the box PW containing the least significant digits of the quoted price ("80" in the illustrated example) as well as the smaller box containing the Big Figure amount (1.40) changes from yellow to red. When the status changes from red to normal, either the quote is withdrawn (if Cancel When Bettered is active) or the background changes from red to yellow.

A quote is "Hittable" from a trading floor, if a regular size hit from that floor would be automatically matched with some part of the quote. In the described embodiment, a quote is "red" if it is Hittable from more than the specified percentage of the trading floors which have bilateral credit with the submitter of the quote. The percentage is a global system parameter, with a default value of 25%.

Suppose that the regular amount is 10M and that the following bids are available (Dealable) to a trading floor X (ranked by decreasing price and then by increasing time of submission): Note that in foreign currency trading, the price is conventionally expressed in "pips" [least significant digits of base currency for a predetermined quantity of local currency], that the amount is conventionally expressed in millions of US dollars, and that a quote can be either a single-sided bid to buy the local currency, or a single-sided offer to sell the local currency, or a two-sided bid and offer [separated by a spread].

| Quote | Price | Amount | Maker |
| --- | --- | --- | --- |
| Bid 1 | 65 | 5M | Floor A |
| Bid 2 | 60 | 3M | Floor B |
| Bid 3 | 20 | 4M | Floor C |
| Bid 4 | 20 | 5M | Floor D |

The first three bids are Hittable from floor X, while Bid 4 is not.

Bid 3, for example, is Hittable from floor X because a regular size hit (Sell 10M at 20) from that floor would match a part (2M) of that bid. If Bid 3 is Hittable from enough floors (25% of the trading floors which have bilateral credit with Floor C), then Bid 3 is red at the Maker's transaction panel.

Figure 3:
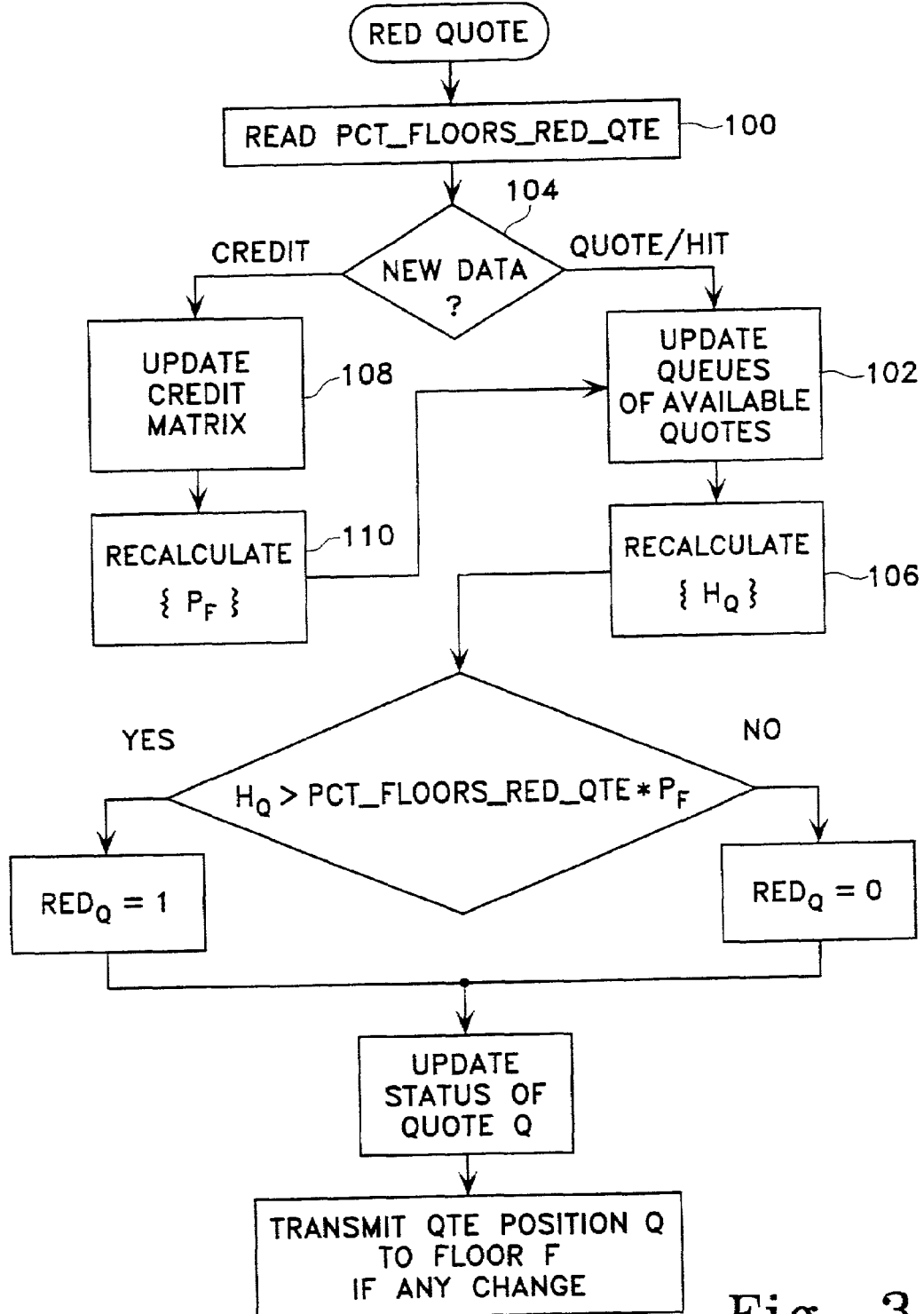
FIG. 3 is a functional block diagram of the software which determines the current Red Quote status for a particular quote.

Reference should now be made to FIG. 3, which is a functional block diagram of the "Red Quote" software in the Arbitrator ARB which determines the current Red Quote status for a particular quote.

As part of the startup process, the Arbitrator reads (block 100) the parameter PctFloorsRedQte from the Arbitrator section of the GLOBAL.DAT file. This is the partner floor percentage determining whether a quote is red.

In known fashion, the Arbitrator maintains (block 102), for each trading floor that is currently logged into the network, a queue in the form of a linked list of pointers to atomic data objects (individual quotes), with each queue being ordered by price and time and the objects in the queue being those quotes that are currently available to that trading floor. The queues are updated each time a new quote is received or its status is changed (it has been accepted or withdrawn, or it has been tentatively matched pending credit verification and acknowledgment by both parties) (Quote/Hit branch from decision block 104) and each time the bilateral credit status between any two trading floors changes (Credit branch from decision block 104).

In addition, in accordance with the present invention, for each quote Q, the Arbitrator uses the data in the trading floor queues to maintain (block 106) a respective count of floors $H_Q$ from which the quote can be hit by a regular size buy/sell request (typically ten million US dollars).

The Arbitrator also maintains in known fashion (block 108) a credit availability matrix containing the bilateral credit status between each pair of trading floors that are currently connected to the system, which is then used to update the quote queues for any affected trading floors (block 102). In accordance with the present invention, for each floor F, the Arbitrator also uses the data in the credit availability matrix to maintain (block 110) the count of its partners $P_F$ (i.e., other floors that have bilateral credit with the given floor).

The Arbitrator thus is able to dynamically adjust both counts ($H_Q$ and $P_F$) in response to any trading or credit messages, and determine (block 112) for each quote whether the quote's $H_Q$-count is higher than a predetermined percentage (defined initially as 25%) of the $P_F$-count for the floor that submitted the quote. The result of this test is stored with the other data concerning that particular quote (block 114), and if the Red Quote status has changed, the QtePosition message is transmitted to the trading floor's bank node MAN (block 116).

The above operations may be clarified with a few numerical examples.

When PctFloorsRedQte=25 (current default value) and $P_F$=195, then a quote is red if it is Hittable from more than (195*25)/100=4875/100=48 floors. This illustrates that the above definition of red status requires a strict inequality.

When PctFloorsRedQte=25, and $P_F$=4, then a quote is red if it is Hittable from more than (4*25)/100=100/100=1 floors.

When PctFloorsRedQte=0, a quote is red if it is Hittable from one or more floors. Thus, with this setting of the global parameter, the above definition of Red Quote is very similar to that used in the known EBS system.

When PctFloorsRedQte=100, no quote is ever red. All active quotes should appear "yellow."

From the foregoing description and examples, it should be apparent that the Red Quote status, as defined above, depends on both the ranking of the quote relative to other quotes in the market and on the bilateral credit relationship of the submitting floor with other floors, and that the Arbitrator ARB dynamically re-computes the Red Quote status of quotes any time that any of these factors is affected (due, for example, to better prices being submitted or new credit being granted by another floor).

Figure 4:
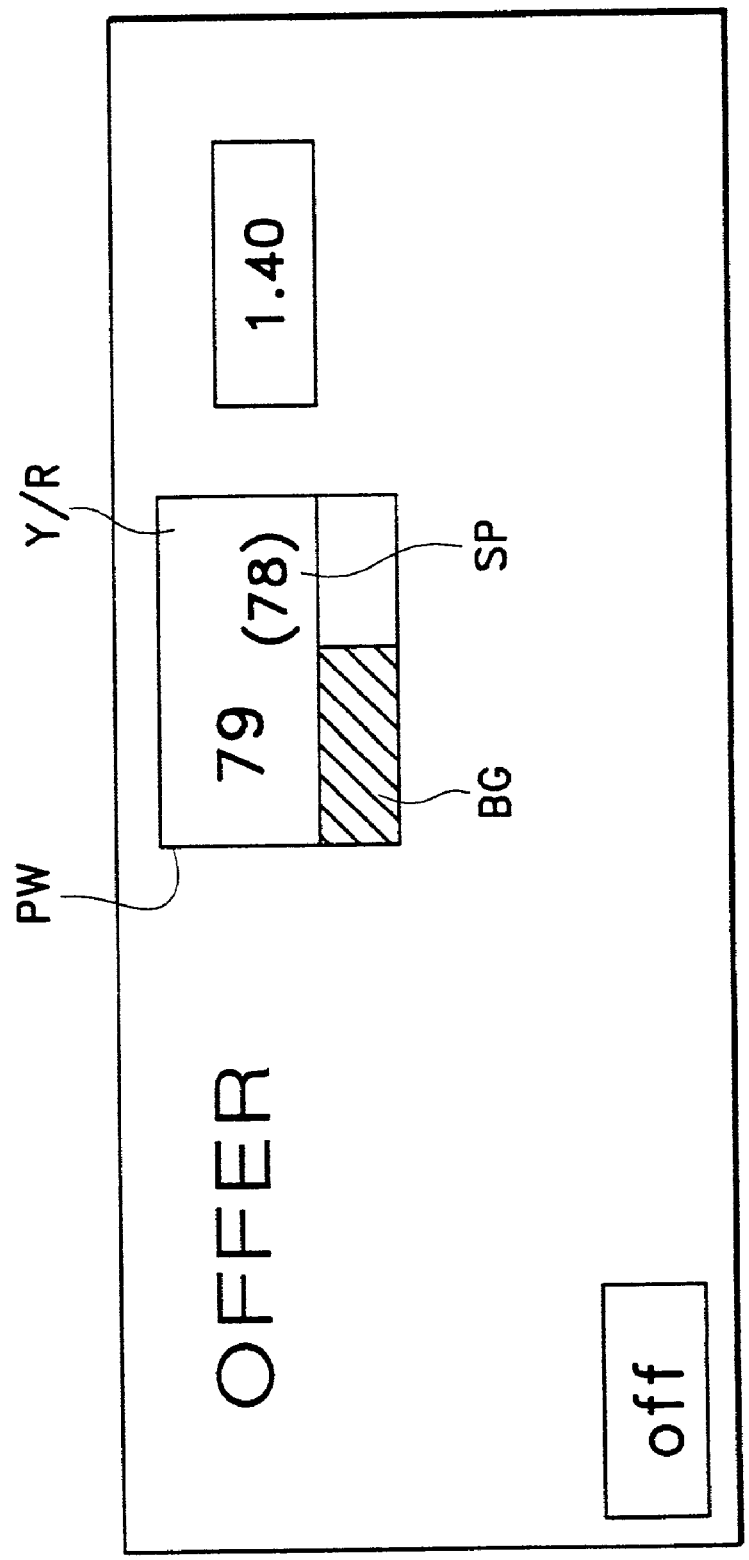
FIG. 4 shows an alternate embodiment for the Transaction Panel in which the ratio of Hittable floors to available partners is displayed as a horizontal bar graph below the quote, and a numerical indication of what price would be required to be Hittable at a given percent of available trading partners is shown above the quote.

FIG. 4 shows an alternate embodiment of the invention in which rather than comparing the variable $H_Q$ with a predetermined percentage of the variable $P_F$, the Arbitrator computes the ratio $H_Q/P_F$, and includes that ratio in the quote status message QtePosition each time the ratio changes by a predetermined increment (for example, 5%). In that case, rather than indicating the status of the active quote as merely normal or red, the workstation can display it as a number or in graphical form. In the illustrated example, the ratio is displayed as a horizontal bar graph BG below the quote, which in the illustrated example extends about ⅔ of the full width of the pips window PW indicating that the price is Hittable by about 65% of the maker's available (on line and with established credit) trading partners.

As also shown in FIG. 4, the market maker may also (or alternatively) be provided with a numerical indication SP of what price would be required to be Hittable at a predetermined percent of available trading partners (for example, the same percentage PctFloorsRedQte as was used in FIG. 3). This could be readily computed by generating an ordered list of the worst Hittable prices (i.e., the price required to complete the lowest ranking component of a regular sized deal) from the quotes of each available trading partner. Since the available partners are already identified in the credit matrix, and since each queue already contains a pointer to the last component of the aggregated regular Dealable price, such a display would not require substantial additional computation, and would provide the market maker with additional assurances that his quote was competitive with other quotes in the market and was priced neither too high nor too low.

It should be apparent that the ratio $H_Q/P_F$ and the numerical price indication SP will change at a greater frequency than the Red Quote status R/Y. Accordingly, in a system having Market Distributor nodes MD as shown in FIG. 1 which use a price queue similar to that maintained in the Arbitrator ARB for computing Dealable prices and transmitting them to the individual trading floors MAN, performing the required computations in a more distributed fashion (in the Market Distributors) will make better use of the communication network.

Doubtless, other variations on the concepts underlying the present invention will be apparent to those skilled in the art.

What is claimed is:

1. A process for notifying a market maker in a computerized trading system that his quote being a maker's quote is subject to being accepted by another trading partner using the computerized trading system, and Wherein the quotes are for a particular financial instrument or other commodity that are selectively made available from the market maker;

Wherein the market maker is an institution or an individual trader whose open offers are available to other trading partners using the computerized trading system, the process comprising:

Determining when a predetermined percentage of available trading partners in the computerized trading system are permitted to accept the market maker's quote, Wherein the predetermined percentage is more than one and less than all of the trading partners using the computerized trading system with which the market maker has bilateral credit; and Informing the market maker via the computerized trading system screen and/or components this his quote can be accepted by the predetermined percentage of trading partners using the computerized trading system with which the market maker has bilateral credit.

2. The process of claim 1, wherein the market maker is visually informed that his quote can be accepted by the predetermined percentage of trading partners using the computerized trading system with which the market maker has bilateral credit.

3. The process of claim 1, wherein the market maker is audibly informed that his quote can be accepted by the predetermined percentage of trading partners using the computerized trading system with which the market maker has bilateral credit.

4. The process of claim 1, wherein the market maker is both visually and audibly informed that his quote can be accepted by the predetermined percentage of trading partners using the computerized trading system with which the market maker has bilateral credit.

5. The process of claim 1, wherein the trading partner using the computerized trading system is only permitted to accept the market maker's quote if there is sufficient bilateral credit between the market maker and the trading partner using the computerized trading system.

6. The process of claim 1, wherein a trading partner using the computerized trading system is only permitted to accept the market maker's quote if there is sufficient bilateral credit between the market maker and the trading partner and the maker's Quote is the best available to the trading partner.

7. The process of claim 1, wherein the trading partner is only permitted to accept the market maker's quote if there is sufficient bilateral credit between the market maker and the trading partner and the market maker's quote is both the best available to the trading partner and is earlier in time to any other quote available to the trading partner at the same price.

8. The process of claim 1, wherein the predetermined percentage is at least 25%.

9. The process of claim 1, wherein the market maker is informed that his quote can be accepted by the predetermined percentage of trading partners by providing the market maker with a quantitative indication of the percentage of trading partners who can accept his quote.

10. The process of claim 9, wherein the quantitative indication is in the form of a graph.

* * * * *